United States Patent [19]
Ruberg

[11] Patent Number: 5,197,721
[45] Date of Patent: Mar. 30, 1993

[54] DEVICE FOR POSITIONING WORKPIECES IN A MILLING MACHINE VISE

[76] Inventor: Mark Ruberg, P.O. Box 290, Miamitown, Ohio 45041

[21] Appl. No.: 905,032

[22] Filed: Jun. 26, 1992

[51] Int. Cl.$^5$ .............................................. B23Q 3/18
[52] U.S. Cl. .................................................. 269/315
[58] Field of Search .................. 909/214, 218; 82/153; 408/16, 116; 33/832, 642, 613; 248/124, 229; 269/45, 71-73, 77, 99, 315, 303, 96-97

[56] References Cited
U.S. PATENT DOCUMENTS

| | | | |
|---|---|---|---|
| 1,126,053 | 1/1915 | McGough | 269/45 |
| 3,810,311 | 5/1974 | Pingel . | |
| 3,827,686 | 8/1974 | Storkh | 269/315 |
| 3,961,557 | 6/1976 | Jezowski . | |
| 4,020,742 | 5/1977 | Raymond . | |
| 4,030,718 | 6/1977 | Philipoff . | |
| 4,275,872 | 6/1981 | Mullis | 269/315 |
| 4,598,480 | 7/1986 | Cukelj . | |
| 4,836,522 | 6/1989 | Smith | 269/315 |

Primary Examiner—Robert C. Watson
Attorney, Agent, or Firm—Ronald W. Kock

[57] ABSTRACT

A device attachable to a milling machine vise for positioning a workpiece in the opening between vise jaws. A rigid bar has means for quickly and accurately clamping the positioning device to parallel sides of a precision vise of standard width. An adjustable rigid intermediate member connected to an outer end of the bar has means for clamping a workpiece contacting rod cantilevered into the vise jaw opening. The workpiece contacting rod is slidably adjusted relative to the intermediate member. It has a contact surface perpendicular to the rod axis. Positioning device surfaces of the present invention are machined parallel to a bar alignment surface. When the bar is attached to a vise, the alignment surface is clamped against the side of the vise substantially parallel to that side. In this manner the workpiece contacting surface of the rod always remains square to the workpiece holding surfaces of the vise jaws, regardless of device position adjustment.

8 Claims, 2 Drawing Sheets

DEVICE FOR POSITIONING WORKPIECES IN A MILLING MACHINE VISE

FIELD OF THE INVENTION

The present invention relates to machine tools and more particularly to devices for repeatedly positioning multiples of the same workpiece in a milling machine vise. Even more particularly, the present invention relates to inexpensive positioning devices that may be dedicated to particular batches of workpieces in order to minimize setup time.

BACKGROUND OF THE INVENTION

Many metalworking shops specialize in precision metal cutting and grinding, especially for multiples of the same workpiece. The machine tools required for such work are very expensive. Economic use of these tools is accomplished by maximum run time and minimum downtime for workpiece setup. One method of achieving minimum downtime is to use setup fixtures dedicated to each different batch of workpieces. For example, a milling machine vise may be modified to support each part, in a batch of workpieces, in a particular position for milling a slot and boring a hole. As long as the vise is not moved relative to the tool, each workpiece can be machined exactly the same by repeating the tool path for each setup. In this manner setup time is minimized, even though precision milling vises are expensive to dedicate to particular workpieces.

A number of different workpiece positioning devices have been invented to locate workpieces in a milling machine vise. Examples are illustrated in U.S. Pat. No. 4,598,480 to Cukelj, U.S. Pat. No. 4,030,718 to Philipoff, U.S. Pat. No. 4,020,742 to Raymond, and U.S. Pat. No. 3,810,311 to Pingel. They are characterized by posts or blocks holding contact arms which enter the opening between vise jaws to contact a workpiece, thereby preventing its lateral movement until the vise jaws can be closed on the workpiece. The posts and blocks are connected either to the milling machine table by T-slot brackets or to the vise by threaded connection. Most are deficient in that the interruption of a batch milling job, wherein the device is moved, necessitates readjustment of the device after it is reinstalled to continue running the batch of parts. Unlike a dedicated vise, most of these positioning devices are not designed to be removed and reused with a particular batch of workpieces with minimum setup time.

The device of Raymond provides for contact arm removal and replacement without adjustment. However, it is quite complex in terms of its large number of precision parts. Its cost may approximate that of a dedicated vise.

Another deficiency of most prior art positioning devices is their workpiece contact surfaces are not maintained square to the vise jaws throughout their ranges of adjustment. Squareness is particularly desired for curved workpiece surfaces such as vertical axis cylinders and horizontal axis disks. Without such squareness the positioning device must contact the exact center of the workpiece to repeatedly position it accurately. Contacting the exact center of a curve is a difficult setup.

A disadvantage of vise-mounted prior art positioning devices is their need for modification of a precision vise in order to attach the device. Typically, holes are drilled and tapped into the top or side surfaces of a vise so that an attachment screw may be threaded into the vise to secure the positioning device to the vise.

OBJECTS OF THE INVENTION

In light of the above, an object of the present invention is an inexpensive workpiece positioning device with means for accurately reestablishing workpiece position without adjustment when the device is removed and later reinstalled.

Another object of the present invention is a device having its workpiece contact surface square to the vise jaws no matter how the device is adjusted after it is installed.

Yet another object of the present invention is a device quickly attachable to and removable from the precision surfaces of a milling machine vise.

Still another object of the present invention is a device attachable to a milling machine vise without the need for modification of the vise for device attachment.

SUMMARY OF THE INVENTION

In practicing the present invention the ground surfaces of a precision milling machine vise are utilized for establishing positioning device squareness relative to vise jaws. Such vises are made with standard widths, and the sides are square with the top surface and with the workpiece holding jaws. Thus, when the alignment surface of a positioning device of the present invention is aligned parallel to the side of a precision milling vise, all other device surfaces, machined parallel to the alignment surface, are substantially square to the vise jaws.

In a preferred embodiment of the present invention, a device for positioning workpieces in a milling machine vise jaw opening comprises a rigid bar removably attachable to the sides of one jaw of the vise. The bar has an alignment surface and an outer end surface parallel to the alignment surface for spacing the outer end surface a predetermined distance from one side of the vise. The bar has means for attaching its alignment surface securely against and parallel to one side of the vise without having to modify the vise. The device also has a rigid intermediate member adjustably connected to the outer end of the bar and a rigid contact rod adjustably connected to the intermediate member. The rod has a workpiece contact surface used to position a workpiece laterally in the vise jaw opening before the jaws are closed on the workpiece. When all parts of the positioning device are fixed relative to each other, the device is removable from the vise and later replaceable without further adjustment to reposition similar workpieces in the vise jaw opening. That is, when the bar is reinstalled to the side of the vise, the contact surface of the rod extends substantially the same distance into the opening between vise jaws as it did before removal. In this way the simple positioning device of the present invention can be dedicated to a particular batch of workpieces, and removed and reinstalled each time they are to be machined.

The rigid bar of the present invention more preferably has a recess adapted to receive the top surface of the vise jaw. The recess has an alignment surface at one end and a downwardly ramped surface at the other end. Between the alignment and ramped surfaces, the bar has a clearance hole located near the ramped end of the recess. The bar also has an outer end surface machined parallel to the alignment surface of the recess. The outer end surface has a threaded hole centered in and perpendicular to the outer surface. A wedge-shaped block, which has a ramped surface parallel to the ramped surface of the recess, and a clamping surface parallel to the alignment surface of the recess, has a threaded hole through it between its ramped and clamping surfaces. The threaded hole may be substantially aligned with the clearance hole in the bar so that a first capscrew may pass through the clearance hole and be threaded into the block when the ramped surfaces of the two parts are in contact. When the cap of that screw is tightened against the bar, the ramped surfaces slide against each other to wedge the clamping surface of the block against one side of the vise jaw while the alignment surface of the recess is pulled against the other side of the vise jaw. In this manner the bar is clamped to the sides of the vise jaw.

A resilient member placed between the bar and the wedge-shaped block acts both to quickly release the block from the side of the vise when the capscrew through the block is loosened, and to hold the ramped surface of the block away from that of the bar during installation of the positioning device to prevent premature clamping.

In the most preferred embodiment of the present invention the rigid intermediate member, connected to the outer end of the bar, has a flat machined surface in contact with the outer end of the bar. It also preferably has an adjustment slot and a second capscrew passing through the slot and into the threaded hole in the outer end of the bar. The screw adjustably connects the intermediate member to the bar. The intermediate member may be rotated about the second capscrew or slided linearly along its slot; however, its machined surface will always remain substantially parallel to the outer end surface of the bar. Near one end of the intermediate member is a hole with its axis machined substantially perpendicular to the machined surface of the intermediate member and extending through the member. A radial slot extending from the end of the intermediate member into the hole permits the hole to be slightly closed when the radial slot width is reduced. The intermediate member has a clearance hole on one side of the radial slot opposed by a threaded hole on the other side. A third capscrew inserted through the clearance hole and into the threaded hole is used to reduce the width of the radial slot.

In the most preferred embodiment of the present invention the rigid contact rod is slidably connected through the hole in the intermediate member. It preferably has a workpiece contact surface cantilevered into the vise jaw opening. The rod may have its contact surface adjustably positioned a desired distance from the machined surface of the intermediate member. The third capscrew may then be tightened to reduce the radial slot width and thereby squeeze the hole around the rod to clamp the rod in the desired position. The contact surface of the rod is preferably machined square to the axis of the rod. Thus, the contact surface of the rod is parallel to the machined surface of the intermediate member, which is parallel to the outer end of the bar, which is parallel to the alignment surface of the recess in the bar, which is parallel to the side of the vise. In this manner, the contact surface of the rod is kept substantially perpendicular to the vise jaws whenever the bar is clamped to the vise, no matter how the parts of the device are adjusted.

DETAILED DESCRIPTION OF THE INVENTION

Figure 1:
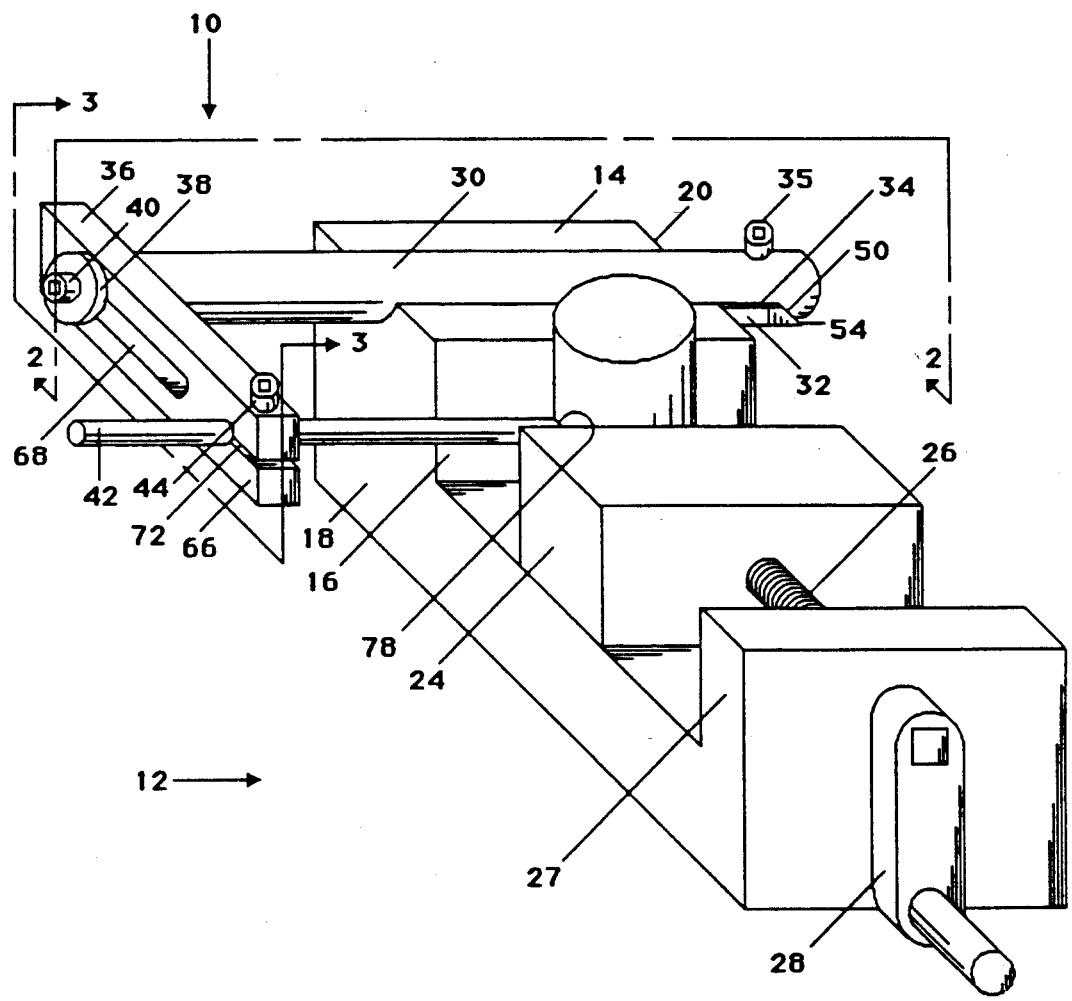
FIG. 1 is a perspective view of a milling machine vise to which a preferred embodiment of the present invention is attached.

Referring now to the drawings, and more particularly to FIG. 1, there is shown a preferred embodiment of the present invention, generally indicated as 10. Positioning device 10 is shown attached to a standard precision milling machine vise 12, across top surface 14 of the fixed jaw 16. Jaw 16 has sides 18 and 20 machined square with its workpiece clamping surface. Jaw 16 is opposed by substantially parallel vise jaw 24, which is slidably movable toward and away from jaw 16. Jaw 24 is moved by a manually rotated screw 26, which extends through screw support 27 of the vise, and which is turned by a handle 28, as is commonly known in the art. Positioning device 10 may be attached to either jaw 24 or jaw 16, but it is preferably attached to jaw 16 because jaw 16 is fixed relative to the milling machine table while jaw 24 is movable with potentially some sideways positional error.

For precision machining, high accuracy milling vises are commonly used. An example is the "AngLock" vise, made by Kurt Manufacturing Company of Minneapolis, Minn. These vises are sized precisely 4 inches, 6 inches, 8 inches and 10 inches wide. Positioning device 10 is sized to be clampable to a particular vise width.

Figure 2:
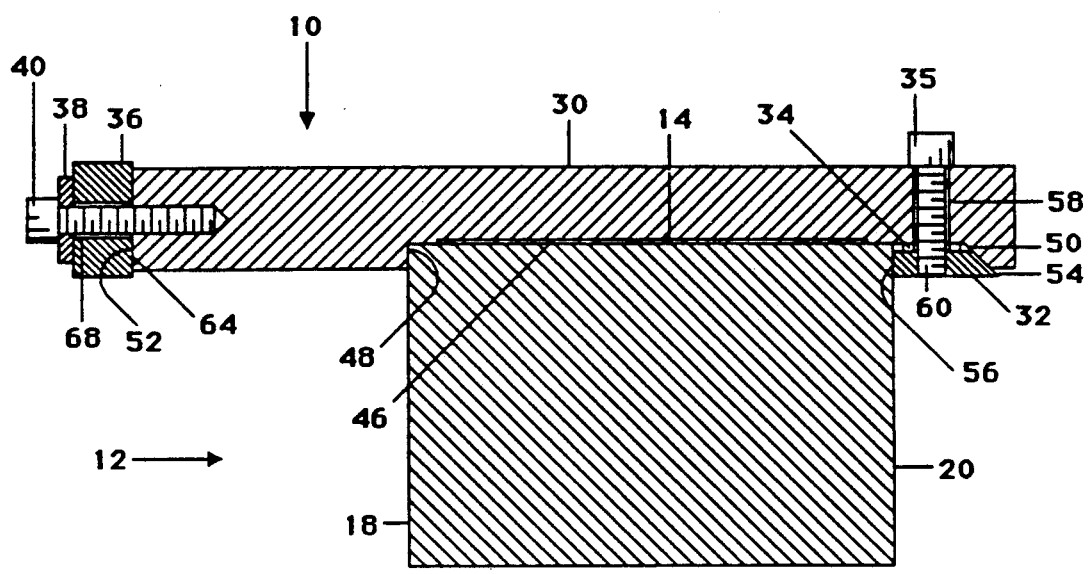
FIG. 2 is a sectioned side elevation view of the preferred embodiment, taken along section line 2—2 of FIG. 1, showing the bar and its wedge-shaped block clamped to the sides of a milling machine vise, and an intermediate member screwed to the end of the bar.

FIGS. 1 and 2 show the preferred means for clamping positioning device 10 to vise 12. Positioning device 10 comprises a bar 30, a wedge-shaped block 32, a resilient member 34, a first capscrew 35, a slotted intermediate member 36, a rigid washer 38, a second capscrew 40, a workpiece contacting rod 42, and a third capscrew 44. Bar 30 is preferably a solid cylindrical bar, but it could be a bar of any cross-section. The important features of bar 30 are its recess 46, an alignment surface 48 of recess 46, a ramped end 50 of recess 46, and an outer end 52 of bar 30, which is machined parallel to alignment surface 48. Bar 30 is clamped to vise 12 by first locating recess 46 across vise top surface 14 so that alignment surface 48 of recess 46 contacts side 18 of vise 12 along the entire length of surface 48.

Wedge-shaped block 32 has a ramped surface 54 and a clamping surface 56. Bar 30 has a clearance hole 58 and block 32 has a threaded hole 60 aligned with clearance hole 58 when ramped surfaces 50 and 54 are engaged. First capscrew 35 is preferably placed through hole 56 and screwed into threaded hole 60. Capscrew 35 has a head larger in diameter than clearance hole 58. When capscrew 35 is tightened, ramped surface 54 of the block slides against ramped surface 50 of recess 46, thereby causing wedge block 32 to move toward alignment surface 48 of recess 46. Clamping surface 56 of block 32 quickly engages side 20 of vise 12.

The matching angle of the ramped surfaces is preferably between 45° and 75° to the longitudinal axis of bar 30. The result of the ramp angle is the generation of a clamping force which is greater than the force exerted on the block by the first capscrew. For example, when capscrew 35 draws block 32 a distance "X" toward bar 30, block 32 is moved a distance "X/(tangent of ramp angle)" toward side 20 of the vise. The clamping force mechanical advantage is the inverse of the ratio of distance the block moves toward the bar and the distance the block moves toward the side of the vise. For 45°, the tangent is 1.0 and the mechanical advantage is 1.0. For 75° the tangent is 3.7 and the clamping force mechanical advantage is 3.7. This clamping force mechanical advantage enables bar 30 to be tightly clamped to vise 12 by a gentle tightening of first capscrew 35. Most preferably a ramp angle of 60° provides a mechanical advantage of about 1.7.

Resilient member 34, located between wedge-shaped block 32 and recess 46 of bar 30, and preferably surrounding first capscrew 35, acts as a spring to release block 32 from side 20 of the vise when first capscrew 35 is loosened. When finely machined or ground surfaces, such as the wedge-shaped block and the side of the vise, are clamped together under high compressive force, there occurs a cohesion-like phenomenon that holds such surfaces together even after the compressive force is removed. Resilient member 34 effectively breaks the cohesion so that block 32 releases from the side of the vise. In this way bar 30 is removed quickly and with a minimum of effort by the user. Resilient member 34 is preferably a rubber washer. However, it may also be one or more metal belleville washers or compression or wave springs.

Alternative methods of clamping bar 30 to the sides of vise 12 are possible. For example, a screw could be threaded into the ramped end of bar 30 parallel to the axis of bar 30, opposing alignment surface 48 of recess 46. This screw could be tightened directly against side 20 of vise 12 to hold bar 30 in place. However, such a "C-clamp" arrangement is not preferred because the screw could mark vise 12 and the rotation of the screw in contact with the vise could twist the bar out of alignment with the vise. Alignment surface 48 of recess 46 must always be located parallel to the side of the vise. Outer end 52 of bar 30 is preferably machined parallel to surface 48. Any surface attached to outer end 52 will therefore always be parallel to the side of vise 12 and remain a fixed distance from the side.

FIG. 2 shows an intermediate member 36 bolted to the outer end 52 of bar 30 by second capscrew 40 threaded into the center of the outer end. Rigid washer 38 between the head of capscrew 40 and intermediate member 36 spreads the bolt load over a large area of member 36 when capscrew 40 is tightened, thereby holding member 36 securely in place. Intermediate member 36 has sides 64 and 66 preferably machined flat and parallel to each other. Extending through both sides of member 36 is a slot 68, illustrated in FIGS. 1 and 3. Second capscrew 40 connects member 36 to the outer end of bar 30 through slot 68. Thus, slot 68 enables member 36 to be slidably and rotatably adjusted about capscrew 40.

Figure 3:
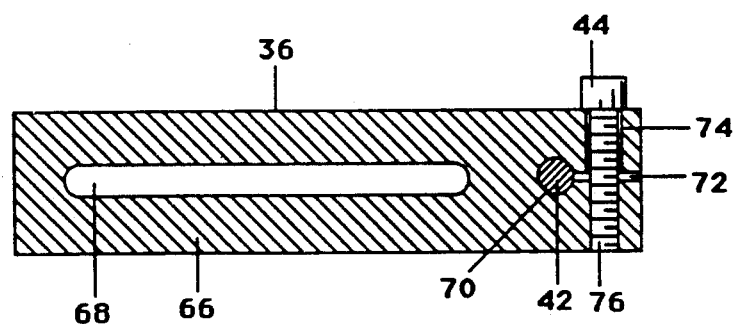
FIG. 3 is a sectioned side elevation view of the preferred embodiment, taken along section line 3—3 of FIG. 1, showing the intermediate member with its adjusting slot and a workpiece contact rod in a hole in the intermediate member, along with means for clamping the workpiece contact rod to the intermediate member.

FIG. 3 shows intermediate member 36 having a hole 70 at one end. Hole 70 is machined perpendicular to side 64 of member 36. Cylindrical workpiece contacting rod 42 extends through hole 70 and is cantilevered into the opening between vise jaws 16 and 24 of vise 12. Member 36 also has a second slot 72 extending from the end of member 36 radially into the center of hole 70 parallel to the axis of the hole. Member 36 has a clearance hole 74 on one side of slot 72 and a threaded hole 76 on the opposite side, axially aligned with hole 74. Third capscrew 44 is fit into clearance hole 74 and screwed into threaded hole 76. The head of capscrew 44 is larger in diameter than clearance hole 74. Therefore, when capscrew 44 is tightened, it acts to close slot 72 and pinch rod 42 inside hole 70. In this manner contact rod 42 is secured to intermediate member 36 after contact rod 42 has been slidably adjusted in hole 70.

FIG. 1 shows contact rod 42 with contact surface 78 against a vertical axis cylindrical workpiece between jaws 16 and 24 of vise 12. Contact surface 78 is preferably machined square to the axis of rod 42. In order to accurately position multiple workpieces of the same shape as the one shown, intermediate member 36 is first adjusted to align rod 42 near the center of the workpiece. Member 36 is then fixed in place by tightening second capscrew 40. Next, contact rod 42 is slidably adjusted in hole 70 until it contacts the workpiece. Finally, contact rod 42 is clamped to member 36 by tightening capscrew 44 to complete the position setup. Whenever a new workpiece is placed against contact surface 78 of contact rod 42 in the opening between vise jaws 16 and 24, it will be in substantially the same position as the first workpiece. Such repeat positioning enables multiple workpieces to be machined with minimum setup time.

FIG. 1 shows the contact surface 78 of rod 42 substantially parallel to side 18 of vise 12 because key surfaces of positioning device 10 are machined parallel or square with each other. Because sides 18 and 20 of vise 12 are substantially perpendicular to workpiece holding surfaces of jaws 16 and 24 of vise 12, contact surface 78 is also square with these jaws. Therefore, even if rod 42 is not prefectly centered on the cylindrical workpiece, the curved surfaces of similar workpieces will contact the rod at the same lateral position within the vise jaws. This would not occur if the end of rod 42 were rounded, pointed, or at some other angle to the vise jaws. Having the contact surface 78 always square with vise jaws 16 and 24 makes setup of the positioning device quicker and easier because exact centering of rod 42 is not required relative to curved surfaces of workpieces.

Although not shown, bar 30 could be attached to vise 12 with alignment surface 48 contacting side 20 of vise 12 instead of side 18. In such an arrangement contact rod 42 would be cantilevered into the vise jaw opening from side 20. Also possible, but not shown, bar 30 could be clamped across the back of the vise jaw instead of across top surface 14 if there were a need to reduce the vertical profile of the positioning device for tool path reasons.

The preferred embodiment of the present invention is fabricated as follows:

Bar 30 is preferably a solid steel round 1.13 inches in diameter. When designed for a 6 inch wide vise, for example, it is about 10 inches long with alignment surface 48 about 3.00 inches from outer end 52. Recess 46 is preferably about 0.31 inches deep. Hole 58, adjacent to ramped surface 50 of the recess, is bored 0.37 inches diameter, and may preferably be counterbored 0.55 inches diameter by 0.32 inches deep for the head of first capscrew 35 to maintain a lower profile for the positioning device. Bar 30 is preferably made of case hardened SAE 1018 steel. Surfaces 48 and 52 are preferably ground parallel to each other after case hardening. The center of outer end surface 52 is bottom tapped SAE 5/16-18 about 0.54 inches deep.

Wedge-shaped block 32 is also preferably made of case hardened SAE 1018 steel. It is about 0.75 inches square and about 0.25 inches thick. One end has a ramped surface 54. Through block 32 is threaded hole 60 tapped SAE 5/16-18.

Resilient member 34 is preferably an annular rubber washer with 0.05 inch outside diameter and 0.31 inch inside diameter. Its rectangular cross-section is about 0.09 inches by 0.09 inches. Rubber washers are preferably punched from a sheet of 90 Shore A durometer Buna N rubber.

Intermediate member 36 is preferably a rectangular bar of case hardened SAE 1018 steel about 5.50 inches long by 0.63 inches thick by 1.00 inch wide. Slot 68 is preferably about 3 inches long starting about 0.63 inches from one end, and it is 0.33 inches wide. Hole 70 in member 36 is located preferably about 0.63 inches from one end of the member, with radial slot 72 about 0.06 inches wide extending from the end of the member into the hole. Hole 70 is preferably 0.31 inches in diameter. Sides 64 and 66 of member 36 are preferably ground parallel after case hardening.

Washer 38 is a case hardened SAE 1018 steel disk about 1.00 inch in diameter and 0.19 inches thick, with a 0.33 inch hole centered therein.

Contact rod 42 is preferably a case hardened steel shaft about 10 inches long and 0.31 inches in diameter. It can be a piece of 5/16 inch drill rod, for example.

First capscrew 35, second capscrew 40, and third capscrew 44 are preferably SAE 5/16-18 steel socket head c ip screws. Such screws are normally case hardened. Capscrew 35 and capscrew 44 are preferably 0.75 inches long. Capscrew 40 is preferably 1.25 inches long. A common 0.25 inch Allen wrench is used with all three capscrews.

It is thought that the positioning device of the present invention, and many of its attendant advantages, will be understood from the foregoing description; and it will be apparent that various changes may be made in form, construction, and arrangement without departing from the spirit and scope of the invention or sacrificing all of its material advantages. the forms hereinbefore described being merely preferred or exemplary embodiments thereof.

What is claimed is:

1. A device for positioning a workpiece in a milling machine vise jaw opening, said device comprising:
    a) a rigid bar removably attachable to a jaw of milling machine vise, said bar having an alignment surface and an outer end surface parallel to said alignment surface, said alignment surface spacing said outer end surface a predetermined distance from the side of the vise when said alignment surface is secured to the side of the vise;
    b) means for attaching said alignment surface of said bar to the side of a vise in a manner that avoids modification to a vise surface and holds said alignment surface parallel to the side of the vise;
    c) a rigid intermediate member having a flat machined surface adjustably connected to said outer end surface of said bar; and
    d) a rigid contact rod adjustably connected to said intermediate member, said rod having a workpiece contact surface, a longitudinal axis perpendicular to said machined surface of said intermediate member, and said workpiece contact surface of said rod is machined square to said longitudinal axis of said rod to maintain said contact surface substantially parallel to said alignment surface of said bar.

2. A device for positioning a workpiece in a milling machine vise jaw opening, said device comprising:
    a) a rigid bar removably attachable to a jaw of a milling machine vise, said bar having a recess adapted to receive the top surface of the vise jaw, said recess having an alignment surface and a ramped surface, said bar also having an outer end surface;
    b) a wedge-shaped block having a ramped surface and a clamping surface, said ramped surface of said block being parallel to said ramped surface of said recess when said clamping surface is parallel to said alignment surface of said recess;
    c) means for drawing said block into said recess so that said ramped surfaces slide against one another, moving said clamping surface of said block toward said alignment surface of said recess to secure said alignment surface of said bar against and parallel to the side of the vise;
    d) a rigid intermediate member adjustably connected to said outer end surface of said bar; and
    e) a rigid contact rod adjustably connected to said intermediate member, said rod having a workpiece contact surface, said surface located to position a workpiece laterally in the vise jaw opening before the vise jaws are closed on the workpiece.

3. The positioning device of claim 2 wherein said intermediate member has a flat machined surface adjustably connected to said outer end surface of said bar, said contact rod has a longitudinal axis perpendicular to said machined surface of said intermediate member, and said workpiece contact surface of said rod is machined square to said longitudinal axis of said rod to maintain said contact surface substantially parallel to said alignment surface of said bar.

4. The positioning device of claim 2 further comprising a resilient member between said bar and said wedge-shaped block to bias said block away from said bar so that when said means for drawing said block into said recess is loosened, said clamping surface of said block quickly releases from the side of the vise jaw.

5. The positioning device of claim 2 wherein said bar has a longitudinal axis and said ramped surface of said bar is at an angle from between 45° and 75° to said longitudinal axis of said bar so that tightening of said means for drawing said block into said recess generates a vise clamping force mechanical advantage of about 1.0 to 3.7.

6. A device for positioning a workpiece in a milling machine vise jaw opening, said device comprising:
    a) a rigid bar removably attachable to a jaw of a milling machine vise, said bar having a recess adapted to receive the top surface of the vise jaw, said recess having an alingment surface and a ramped surface, said recess also having a clearance hole between said alignment and ramped surfaces near said ramped surface, said bar also having an outer end surface;
    b) a wedge-shaped block having a ramped surface and a clamping surface, said ramped surface of said block being parallel to said ramped surface of said recess when said clamping surface is parellel to said alignment surface of said recess, said block also having a threaded hole between said ramped and clamping surfaces, said threaded hole being substantiallly aligned with said clearance hole in said bar when said ramped surfaces are in contact;

c) a capscrew inserted into said clearance hole of said bar and threaded into said threaded hole of said block so that when said screw is tightened against said bar, said ramped surfaces slide against one another moving said clamping surface of said block toward said alignment surface of said recess to secure said alignment surface of said bar against the side of the vise;

d) a rigid intermediate member connected to said outer end surface of said bar, said intermediate member having a hole therethrough, said hole having an axis substantially perpendicular to said outer end surface of said bar, said intermediate member also having a rod clamping means associated with said hole; and e) a rigid rod slidably connected through said hole in said intermediate member, said rod having a contact end cantilevered into said vise jaw opening so that said contact end may be adjustably positioned and clamped to said intermediate member by said rod clamping means in order to limit the lateral movement of a workpiece placed in the vise jaw opening.

7. The position device of claim 6 further comprising a resilient member between said bar and said wedge-shaped block to bias said block away from said bar so that when said capscrew is loosened, said clamping surface of said block quickly releases from the side of the vise jaw, thereby unclamping said bar from the vise jaw.

8. The positioning device of claim 6 wherein said bar has a longitudinal axis, and said ramped surface of said bar is at an angle from between 45° and 75° to said longitudinal axis of said bar so that tightening of said capscrew generates a vise clamping force mechanical advantage of about 1.0 to 3.7.

* * * * *